United States Patent [19]
Chang et al.

[11] Patent Number: 5,835,592
[45] Date of Patent: *Nov. 10, 1998

[54] SECURE, SWIFT CRYPTOGRAPHIC KEY EXCHANGE

[76] Inventors: Chung Nan Chang, 1455 Wessex Ave., Los Altos, Calif. 95024; Chuan Kuan Yuan; Feng Qi Hao, both of 993 Jungfrau Ct., Milpitas, Calif. 95035

[ * ] Notice: The term of this patent shall not extend beyond the expiration date of Pat. No. 5,583,939.

[21] Appl. No.: 534,960

[22] Filed: Sep. 28, 1995

Related U.S. Application Data

[63] Continuation of Ser. No. 460,675, Jun. 1, 1995, Pat. No. 5,583,939.

[51] Int. Cl.$^6$ .............................. H04L 9/00; H04K 1/00
[52] U.S. Cl. .............................. 380/21; 380/30; 380/46; 380/49
[58] Field of Search .................. 380/21, 28, 30, 380/49, 44, 46

[56] References Cited

U.S. PATENT DOCUMENTS

| | | | |
|---|---|---|---|
| 3,796,830 | 3/1974 | Smith | 178/22 |
| 3,798,359 | 3/1974 | Feistel | 178/22 |
| 3,798,360 | 3/1974 | Feistel | 178/22 |
| 3,798,605 | 3/1974 | Feistel | 340/172.5 |
| 4,200,770 | 4/1980 | Hellman et al. | 178/22 |
| 4,218,582 | 8/1980 | Hellman et al. | 178/22 |
| 4,405,829 | 9/1983 | Rivest et al. | 178/22.1 |
| 4,424,414 | 1/1984 | Hellman et al. | 178/22.11 |
| 4,625,076 | 11/1986 | Okamoto et al. | 178/22.11 |
| 4,748,668 | 5/1988 | Shamir et al. | 380/30 |
| 4,850,019 | 7/1989 | Shimizu et al. | 380/29 |
| 4,995,082 | 2/1991 | Schnorr | 380/23 |
| 5,003,596 | 3/1991 | Wood | 380/28 |
| 5,265,164 | 11/1993 | Matyas et al. | 380/30 |

OTHER PUBLICATIONS

Schneier, Bruce, "Applied Crytography, Protocols, Algorithms, and Source Code in C," Copyright 1994 John Wiley & Sons, Inc.

*Primary Examiner*—Stephen C. Buczinski
*Attorney, Agent, or Firm*—Donald E. Schreiber

[57] ABSTRACT

Using the present cryptographic key exchange protocol, a first of two cryptographic units selects quantities "A" and "B." That same unit then applies a mathematical function "$\Phi_1$" to A and B to compute a third quantity "C.". A and B and the function $\Phi_1$ posses the property that knowing A or B, and C, and the function $\Phi_1$, it is mathematically impossible to compute the unknown quantity B or A. The first unit then transmits A together C to the second unit while retaining B. The second unit selects a fourth quantity "D" and then applies a second mathematical function $\Phi_2$ to A and D to compute a quantity "E" which the second unit transmits to the first unit while retaining D. The quantities A and D and the function $\Phi_2$ must posses the property that knowing D and E, and the function $\Phi_2$, it is mathematically impossible to compute the unknown quantity D. Then the second unit applies a third mathematical function "$\Psi_2$" to D and C to compute the key "K." The first unit upon receiving the quantity E then applies a fourth mathematical function $\Psi_1$ to B and E to also compute the key K.

47 Claims, 2 Drawing Sheets

SECURE, SWIFT CRYPTOGRAPHIC KEY EXCHANGE

RELATED U.S. APPLICATION DATA

Continuation of Ser. No. 460,675, Jun. 1, 1995, U.S. Pat. No. 5,583,939.

BACKGROUND OF THE INVENTION

1. Field of the Invention

The present invention relates generally to cryptography and, more particularly, to the exchanging of cryptographic keys between two cryptographic units.

2. Description of the Prior Art

Two mutually-exclusive classes of cryptographic methods and protocols are well recognized by those familiar with cryptography, symmetric cryptography and public-key cryptography. In symmetric cryptographic protocols, the same key and cryptographic method are used both for encrypting a plaintext message into cyphertext, and for decrypting a cyphertext to recover the plaintext. It is readily apparent that the security of a symmetric cryptographic protocol can never exceed the security of the single key used both for encryption and decryption.

In public-key cryptographic protocols there are two keys, a public key to which anyone can gain access and which is used only for encrypting a plaintext message, and a private key which only the recipient possesses and which is used only for decrypting a cyphertext. For a public-key cryptographic protocol to be secure it must be unfeasible to determine the private key by analyzing the public key. While public-key cryptographic systems appear alluring, thus far in practice it has been observed that public-key cryptographic methods are significantly slower than symmetric cryptographic methods. In general, it has been found that public-key cryptographic methods are 1000 times slower than symmetric cryptographic methods.

Managing the distribution of cryptographic keys is the most difficult security problem in using cryptography both for symmetric protocols and for public-key protocols. Developing secure cryptographic methods and protocols is not easy, but making sure the keys used with such methods and protocols remain secret is an even more difficult task. "Cryptanalysts often attack both symmetric and public-key cryptosystems through their key management." Schneier, *Applied Cryptography,* © 1994 John Wiley & Sons, Inc. ("Schneier") p. 140.

For symmetric cryptographic protocols, there are three well recognized key management problems. First a key may be compromised which permits an eavesdropper who obtains the key either to read all the cyphertext, or even to broadcast bogus cyphertext. The only way to alleviate this problem is to change keys frequently. A second problem for symmetric cryptography key management is that it requires a large number of keys if each pair of individuals in a group is to communicate using a different key. Forty-five unique keys are required if a group of 10 individuals are to communicate. Fifty-five unique keys are required for communication among a group of 11 individuals. The final problem for key management in symmetric cryptographic protocols is that, since keys are more valuable than the encrypted messages, the keys must be exchanged by a secure communication. One approach for securely distributing keys of a symmetric cryptographic protocol is to distribute the keys using a public-key cryptographic protocol.

Whether used with a symmetric cryptographic protocol or with a public-key cryptographic protocol, an encryption key should not be used indefinitely. First, the longer a key is used the more likely it will be compromised by theft, luck, extortion, bribery or cryptanalysis. Long use of a key aids an eavesdropper because that provides more cyphertext encoded with the same key to which cryptoanalytic methods may be applied. Second, on the average the longer a key is used the greater the loss if the key is compromised.

Schneier pp. 376–381 describes various key exchange protocols including:

1. Shamir's Three-Pass protocol;
2. a COMSET protocol; and
3. an Encrypted Key Exchange protocol that may be implemented with various different cryptographic methods such as:
   a. a Rivest, Shamir and Adleman ("RSA") public-key cryptographic method that is described in U.S. Pat. No. 4,405,829;
   b. an ElGamal public-key cryptographic method; and
   c. a Diffie-Hellman public-key cryptographic method that is described in U.S. Pat. No. 4,200,770.

U.S. Pat. Nos. 4,405,829 and 4,200,770 together with Schneier are hereby incorporated by reference.

While all of the preceding protocols provide secure methods for establishing a key, the various protocols require exchanging several, time consuming communications between the parties to establish the key. Moreover, those protocols which require using a public-key cryptographic method also suffer from the slowness of such methods. Moreover, the preceding key exchange protocols are no more secure than the cryptographic method which they employed for key exchange.

SUMMARY OF THE INVENTION

An object of the present invention is to provide a cryptographic key exchange protocol which is simpler than present protocols.

Another object of the present invention is to provide a cryptographic key exchange protocol that is faster than present protocols.

Another object of the present invention is to provide an encryption key exchange protocol that is secure against all but a brute force cryptanalysis attack.

Briefly, in one embodiment of the present invention a first of two cryptographic units "T" and "R" wishing to establish a cryptographic key "K" initially selects a first quantity "A" and a second quantity "B." That same unit then uses a first mathematical function "$\Phi_1$" and the selected quantities A and B to compute a third quantity "C"=$\Phi_1$(A, B). The selected quantities A and B and the function $\Phi_1$ must posses the property that knowing one or the other of the selected quantities A or B, the computed quantity C, and the function $\Phi_1$, it is mathematically impossible to compute the unknown quantity B or A. The first unit T or R which selected the quantities A and B then transmits the selected quantity A together with the computed quantity C to the other, second unit R or T, while retaining at the first unit T or R the selected quantity B.

Upon receiving the quantities A and C transmitted by the first unit T or R, the second unit R or T first selects a fourth quantity "D." Then using a second mathematical function $\Phi_2$ and the received quantity A together with the selected quantity D, the second unit T or R computes a fifth quantity "E"=$\Phi_2$(A, D) which the unit transmits to the first unit T or R, while retaining the selected quantity D. The selected quantities A and D and the function $\Phi_2$ must posses the property that knowing one or the other of the selected quantities A or D, the computed quantity E, and the function $\Phi_2$, it is mathematically impossible to compute the unknown quantity D or A. Then the second unit R or T uses a third mathematical function "$\Psi_2$" and the retained quantity D together with the received quantity C to compute the key "K"=$\Psi_2$(D, C)=$\Psi_2$(D, $\Phi_1$ {A, B}).

The first unit T or R upon receiving the quantity E transmitted by the unit R or T then uses a fourth mathematical function $\Psi_1$ and the retained quantity B together with the received quantity E to also compute the key K=$\Psi_1$(B, E)=$\Psi_1$(B, $\Phi_2$ {A, D})=$\Psi_2$(D, $\Phi_1$ {A, B}).

Various algebraic systems, such as vector algebra and complex number algebra, possess the properties needed for the functions $\Phi_1$, $\Phi_2$, $\Psi_1$ and $\Psi_2$ by the present invention. An advantage of the present invention is that it is mathematically impossible for an eavesdropper knowing the selected quantity A, the computed quantities C and E, and the functions $\Phi_1$, $\Phi_2$, $\Psi_1$ and $\Psi_2$, to directly determine either of the selected quantities B or D, or key K because there is no inverse function that may be applied to determine these quantities.

These and other features, objects and advantages will be understood or apparent to those of ordinary skill in the art from the following detailed description of the preferred embodiment as illustrated in the various drawing figures.

DETAILED DESCRIPTION OF THE PREFERRED EMBODIMENT

Figure 1:
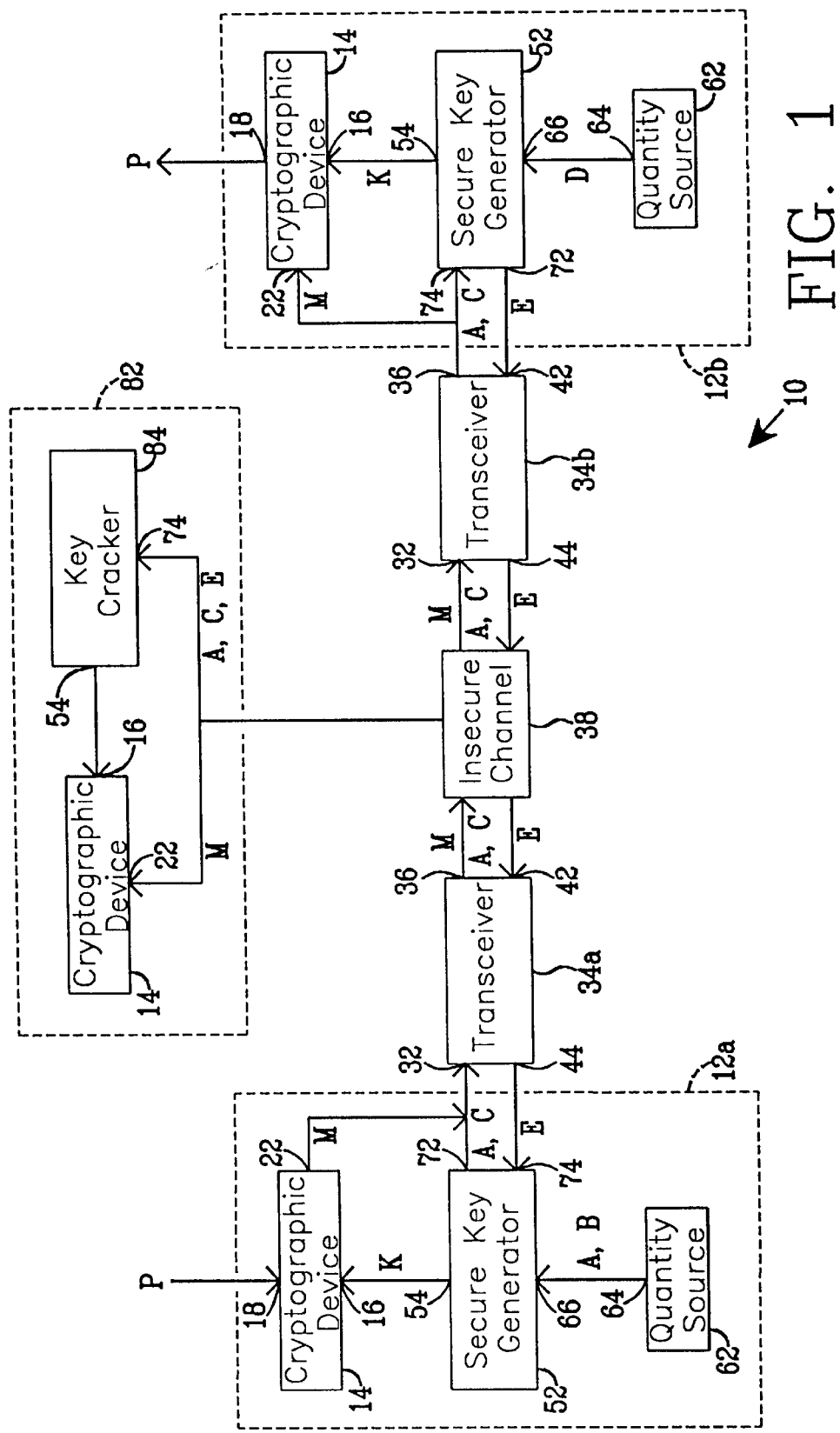
FIG. 1 is a block diagram depicting a cryptographic system which may be employed for secure cryptographic key exchange via an insecure communication channel.

FIG. 1 illustrates a cryptographic system which may be employed for cryptographic key exchange that is referred to by the general reference character 10. The cryptographic system 10 includes a first cryptographic unit 12a enclosed within a dashed line, and a second cryptographic unit 12b also enclosed within a dashed line. Each of the cryptographic units 12a and 12b respectively includes a cryptographic device 14. Each cryptographic device 14 includes a key input port 16, a plaintext port 18, and a cyphertext port 22.

The illustration of FIG. 1 depicts the cyphertext port 22 of the cryptographic device 14 included in the first cryptographic unit 12a as being coupled to a first input port 32 of a first transceiver 34a. Consequently, the cyphertext port 22 may supply a cyphertext message "M" to the first transceiver 34a. The first transceiver 34a also includes a first output port 36 from which the first transceiver 34a transmits the cyphertext message M via an insecure communication channel 38 to a first input port 32 of a second transceiver 34b. The insecure communication channel 38 may include a telephone link, a radio link, a microwave link, a coaxial cable link, a fiber optic link, or any other communication technology that permits transmitting data from a first location to a second location. Thus, for example, while an electronic or optical communication technology is presently preferred for the insecure communication channel 38, the insecure communication channel 38 might also include a messenger service, or a postal service. For a telephonic communication channel 38, the transceivers 34a and 34b might each respectively be conventional modems. Upon receipt of the cyphertext message M at the first input port 32 of the second transceiver 34b, the second transceiver 34b transmits the cyphertext message M from a first output port 36 to the cyphertext port 22 of the cryptographic device 14 included in the second cryptographic unit 12b.

Arranged as described above and as illustrated in FIG. 1, the cryptographic units 12a and 12b provide a cryptographic system 10 in which a plaintext message P may be:

1. presented to the plaintext port 18 of the cryptographic device 14 included in the first cryptographic unit 12a;
2. encrypted by the cryptographic device 14 into the cyphertext message M;
3. transmitted from the cyphertext port 22 of the cryptographic device 14 via:
   a. the first transceiver 34a;
   b. the insecure communication channel 38; and
   c. the second transceiver 34b to the cyphertext port 22 of the cryptographic device 14 of the second cryptographic unit 12b;
4. decrypted by the cryptographic device 14 back into the plaintext message P; and
5. transmitted from the plaintext port 18 of the cryptographic device 14 included in the second cryptographic unit 12b.

Alternatively, though not illustrated in FIG. 1, the cryptographic system 10 could be arranged so the plaintext message P is transmitted as a cyphertext message M from the second cryptographic unit 12b to the first cryptographic unit 12a. To effect such a reverse transmission of the plaintext message P, the cyphertext port 22 of the cryptographic device 14 included in the second cryptographic unit 12b would be coupled to a second input 42 of the second transceiver 34b rather than to its first output port 36. A second output 44 of the second transceiver 34b would then transmit the cyphertext message M via the insecure communication channel 38 to a second input 42 of the first transceiver 34a. A second output 44 of the first transceiver 34a, rather than its first input port 32, would then be coupled to the cyphertext port 22 of the cryptographic device 14 included in the first cryptographic unit 12a. Accordingly, in principle the cryptographic system 10 illustrated in FIG. 1 is capable of being configured for cryptographic transmission of the plaintext message P either from the first cryptographic unit 12a to the second cryptographic unit 12b as depicted in FIG. 1, or from the second cryptographic unit 12b to the first cryptographic unit 12a.

The precise cyphertext message M transmitted between the cryptographic units 12a and 12b depends not only upon the plaintext message P, but also upon a particular cryptographic method employed by the cryptographic device 14 for encryption and/or decryption, and upon a cryptographic key "K" respectively supplied to the key input port 16 of each cryptographic device 14. To supply a cryptographic key K to each cryptographic device 14, both cryptographic units 12a and 12b in accordance with the present invention respectively include a key generator 52 having a key output port 54 from which the key generator 52 transmits the cryptographic key K to the cryptographic device 14.

The cryptographic system 10 depicted in FIG. 1 employs a symmetric cryptographic method for encrypting the plaintext message P, and for decrypting the cyphertext message M. Accordingly, in the illustration of FIG. 1, the cryptographic key K supplied by the key generator 52 to the cryptographic device 14 of the first cryptographic unit 12$a$ is identical to the cryptographic key K supplied by the key generator 52 to the cryptographic device 14 of the second cryptographic unit 12$b$. Described below are several different protocols by which the cryptographic units 12$a$ and 12$b$ may mutually establish a cryptographic key K in accordance with the present invention by exchanging messages between the cryptographic units 12$a$ and 12$b$ via the first transceiver 34$a$, the insecure communication channel 38 and the second transceiver 34$b$.

Vectorial Key Exchange Protocols

One method for establishing a cryptographic key K in accordance with the present invention employs vector algebra. In a first protocol employing vector algebra to establish the cryptographic key K, a quantity source 62, included in the first cryptographic unit 12$a$, selects two non-parallel vectors "A" and "B." To generate the components of the vectors A and B a random number generator may be used within the quantity source 62, or any of the methods described in Schneier at pp. 140–145 may be employed. The quantity source 62 then transmits the vectors A and B from a quantity output port 64 of the quantity source 62 to a quantity input port 66 of the key generator 52 included in the first cryptographic unit 12$a$. Upon receiving the vectors A and B from the quantity source 62, the key generator 52 uses the vector cross-product mathematical function and those variables in computing a third vector "C."

$$C = A \times B$$

Figure 2:
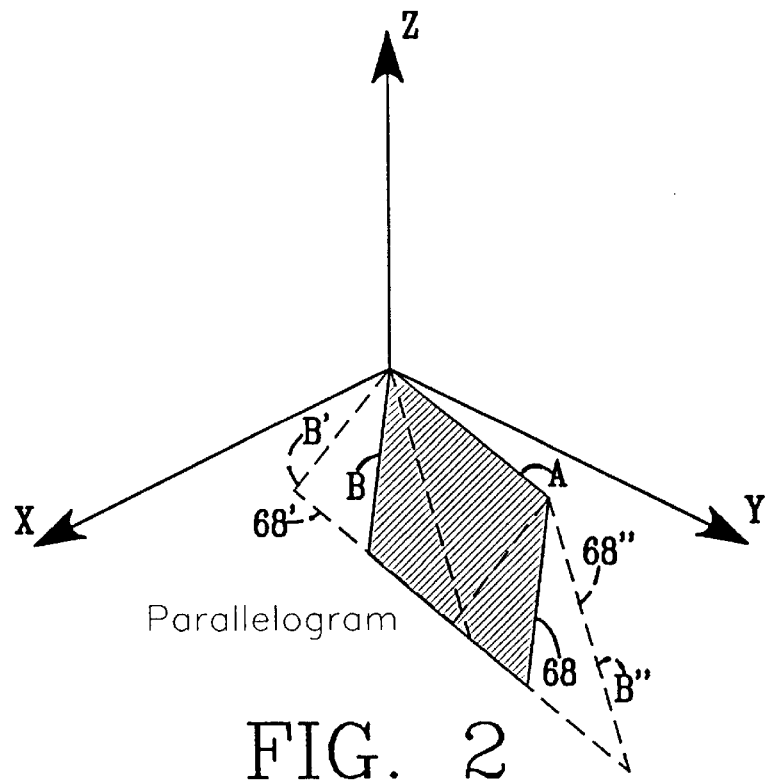
FIG. 2 depicts a three dimensional coordinate system having axes X, Y and Z together with vectors A and B that graphically illustrates principles of vector algebra that are pertinent to a vector algebraic key exchange protocol.

FIG. 2 depicts a three dimensional coordinate system having axes X, Y and Z and together with vectors A and B that, for example, lie in a plane which also includes the X and Y axes. As is well established by a theorem of vector algebra, a cross-product of the vectors A and B is a vector C, not depicted in FIG. 2. The vector C has a magnitude that is equal to the area of a parallelogram 68, filled with hatching in FIG. 2, for which the vectors A and B form adjacent sides. The theorem of vector algebra also establishes that the vector C has a direction which is parallel to the axis Z. As is readily apparent from FIG. 2, the vector C has a magnitude of zero (0) if the vectors A and B are parallel to each other. Consequently, the quantity source 62 must choose vectors A and B that are not parallel.

After the key generator 52 computes the vector C, it then retains the vector B within the key generator 52 while transmitting the vectors A and C from an output port 72 of the key generator 52 to the first input port 32 of the first transceiver 34$a$. Upon receiving the vectors A and C, the first transceiver 34$a$ transmits the vectors A and C from its first output port 36, through the insecure communication channel 38 to the first input port 32 of the second transceiver 34$b$. Upon receiving the vectors A and C, the second transceiver 34$b$ in turn transmits the vectors A and C from its first output port 36 to an input port 74 of a key generator 52 included in the second cryptographic unit 12$b$.

In addition to receiving the vectors A and C transmitted from the first cryptographic unit 12$a$, a quantity input port 66 of the key generator 52 included in the second cryptographic unit 12$b$ also receives a vector "D" from a quantity output port 64 of a quantity source 62 included in the second cryptographic unit 12$b$. The quantity source 62 may generate the vector D using the same method as, or a different method from, that used by the quantity source 62 included in the first cryptographic unit 12$a$. The vector D must not be parallel to the vector A which the key generator 52 receives from the first cryptographic unit 12$a$, and may not be coplanar with the vectors A and B. Upon receiving the vector D, the key generator 52 included in the second cryptographic unit 12$b$ also uses the vector cross-product function and the vectors A and D in computing a fifth vector "E."

$$E = A \times D$$

After the key generator 52 computes the vector E, it then retains the vector D within the key generator 52 while transmitting the vector E from an output port 72 of the key generator 52 included in the second cryptographic unit 12$b$ to the second input 42 of the second transceiver 34$b$. Upon receiving the vector E, the second transceiver 34$b$ transmits the vector E from its second output 44, through the insecure communication channel 38 to the second input 42 of the first transceiver 34$a$. Upon receiving the vector E, the first transceiver 34$a$ in turn transmits the vector E from its second output 44 to an input port 74 of the key generator 52 included in the first cryptographic unit 12$a$. After the key generator 52 included in the second cryptographic unit 12$b$ transmits the vector E to the key generator 52 included in the first cryptographic unit 12$a$, it then uses a vector dot-product function together with the vectors C and D as variables in computing the cryptographic key K that equals an absolute value of the dot-product of the vector D with the vector C.

$$K = |D \cdot C| = |D \cdot (A \times B)| = |B(A \times D)|$$

Figure 3:
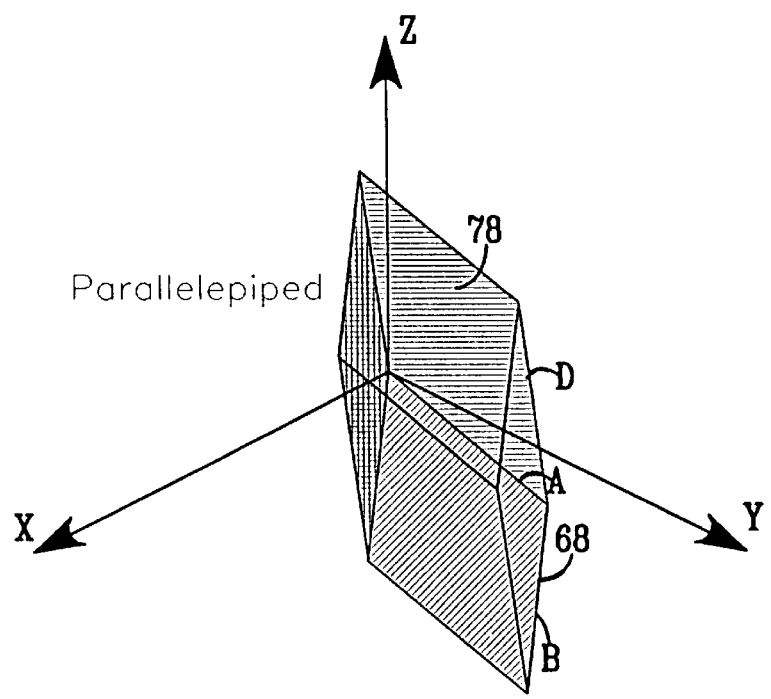
FIG. 3 depicts the three dimensional coordinate system of FIG. 2 having axes X, Y and Z together with vectors A, B that graphically illustrates additional principles of vector algebra that are pertinent to a vector algebraic key exchange protocol.

As is well established by a theorem of vector algebra and as illustrated in FIG. 3, the absolute value of the vector dot-product of the vector D with the vector C is a number that equals the volume of a parallelepiped 78 having the vectors A, B and D as adjacent edges. If the vector D were coplanar with the vectors A and B, or if the vectors A and B were parallel, or if the vectors A and D were parallel, then the cryptographic key K would equal zero (0).

After computing the cryptographic key K, the key generator 52 included in the second cryptographic unit 12$b$ transmits the cryptographic key K from the key output port 54 to the key input port 16 of the cryptographic device 14 thereby preparing the cryptographic device 14 either to encrypt the plaintext message P, or to decrypt the cyphertext message M.

Upon receiving the vector E, the key generator 52 included in the first cryptographic unit 12$a$ uses the vector dot-product function together with the vectors B and E to also compute the cryptographic key K that equals the absolute value of the dot-product of the vector E with the vector E.

$$K = |B \cdot E| = |B \cdot (A \times D)|$$

After computing the cryptographic key K, the key generator 52 included in the first cryptographic unit 12$a$ transmits the cryptographic key K from its key output port 54 to the key input port 16 of the cryptographic device 14 thereby preparing the cryptographic device 14 either to encrypt the plaintext message P, or to decrypt the cyphertext message M.

Because the cryptographic system 10 includes the insecure communication channel 38, an eavesdropper 82, which is not included in the cryptographic system 10 and which is enclosed within a dashed line in FIG. 1, may receive all of the communications between the first cryptographic unit 12$a$ and the second cryptographic unit 12$b$. Accordingly, the eavesdropper 82 receives the vectors A, C and E and also the cyphertext message M. The eavesdropper 82 also includes a cryptographic device 14 which is functionally identical to, and may in principle be the same as, the cryptographic device 14 included both in the first cryptographic unit 12a and in the second cryptographic unit 12b. Therefore, if the eavesdropper 82 were able to determine the cryptographic key K (e.g. by applying an inverse function to the vectors A and C or to the vectors A and E) and supply the cryptographic key K to a key input port 16 of the cryptographic device 14, the eavesdropper 82 could decrypt the cyphertext message M to read the plaintext message P. Furthermore, if the eavesdropper 82 possess the cryptographic key K the eavesdropper 82 could then also transmit bogus cyphertext message M either to the first cryptographic unit 12a, to the second cryptographic unit 12b, or to both.

Therefore, the eavesdropper 82 also includes a key cracker 84 that is capable of mathematically analyzing the vectors A, C and E in an attempt to determine the cryptographic key K. Because the eavesdropper 82 receives the vectors A, C and E, it has available the following information about the vectors A and C which it may employ in an attempt to determine the cryptographic key K.

$$A = (a_1, a_2, a_3)$$

$$C = (c_1, c_2, c_3) = (A \times B)$$

The vector C may be rewritten into its vector components as follows.

$$c_1 = 0 + a_2 b_3 - a_3 b_2$$

$$c_2 = a_1 b_3 + 0 + a_3 b_1$$

$$c_3 = a_1 b_2 - a_2 b_1 + 0$$

Therefore, an algebraic analysis of the components of the vector C to determine the components of the vector B involves solving three linear equations in the three unknown components of the vector B, ($b_1$, $b_2$, $b_3$). The determinant for the preceding system of equations, which must be used as a denominator in solving the three preceding linear equations, is set forth below.

$$\begin{vmatrix} 0 & a_2 & -a_3 \\ -a_1 & 0 & a_3 \\ a_1 & -a_2 & 0 \end{vmatrix}$$

Because the preceding determinant evaluates to zero, the system of three equations does not have a unique solution. That is, there does not exist an inverse function that may be applied to the vectors A and C to determine the vector B. Stated in another way, there exist an unlimited number of solutions for the three equations set forth above. Therefore the key cracker 84 included in the eavesdropper 82 cannot directly determine the correct vector B to be used in combination with the vector E to compute the cryptographic key K or the vectors A and E.

FIG. 2 illustrates geometrically why it is impossible for the key cracker 84 to determine the vector B. The vectors A and B, as depicted in FIG. 2, lie in the XY plane. As stated above, the magnitude of the vector C equals the area of the parallelogram 68 for which the vectors A and B form adjacent sides. However, 5 knowing only the vector A, it is readily apparent that there exist an unlimited number of possible different vectors B', B", etc. which in combination with the vector A establish parallelograms 68', 68" etc. each one of which has the same area as the parallelogram 68. Consequently, knowing only the vectors A and C it is impossible to determine the vector B which the key output port 54 used with the vector A in computing the vector C The cross-product and dot-product functions are fundamental, basic operations in vector algebra. Accordingly, everyone familiar with that subject knows how to evaluate such functions. Because the arithmetic employed in this vectorial key exchange method is entirely linear, the necessary computations may be performed swiftly either by a general purpose computer, such as a microprocessor, executing a computer program, or by a special purpose, hard-wired key generator 52 dedicated exclusively to performing vectorial key exchange. Vectorial key exchange is so swift that with modern microprocessors it is possible for frequency hopping spread spectrum communication devices, such as a portable telephone and its base station, to employ the method in real time in agreeing upon a subsequent frequency to which both units switch in continuing a communication.

While the vectorial key exchange method described thus far uses the same functions, i,e, the vector cross-product and the vector dot-product, in the key generator 52 both of the first cryptographic unit 12a and of the second cryptographic unit 12b, there exist other sets of vector functions which may be used for key exchange in which the key generator 52 of the first cryptographic unit 12a uses functions which are different from the functions used by the key generator 52 of the second cryptographic unit 12b. For example, instead of computing the vector cross-product $$E = A \times D$$

the key generator 52 of the second cryptographic unit 12b may use those same variables in evaluating a vector triple product function $$E = (A \times D) \times A.$$

As before the second cryptographic unit 12b returns the vector E to the first cryptographic unit 12a, but instead of evaluating an absolute value of dot-product of the vector D with the vector C to determine the cryptographic key K, the second cryptographic unit 12b evaluates the absolute value of the dot-product of the vector C with the cross-product of the vector A with the vector D.

$$K = |C \cdot (A \times D)| = |(A \times B) \cdot (A \times D)|$$

A theorem of vector algebra establishes that $$K = |(A \times B) \cdot (A \times D)| = |(A \cdot A)(B \cdot D) - (A \cdot D)(B \cdot A)|$$

Similar to the first set of functions described above, upon receiving the vector E the first cryptographic unit 12a determines the cryptographic key K by again evaluating the absolute value of the dot-product of the vector B with the vector E.

$$K = |B \cdot E| = |B \cdot ((A \times D) \times A)|$$

A theorem of vector algebra establishes that $$(A \times D) \times A = D(A \cdot A) - A(D \cdot A).$$

Substitution of the preceding relationship into the expression that the key generator 52 of the first cryptographic unit 12a evaluates for the cryptographic key K shows that the cryptographic key K used respectively by the first cryptographic unit 12a and the second cryptographic unit 12b are identical.

$$K = |B \cdot E| = |B \cdot (D(A \cdot A) - A(D \cdot A))|$$

$$K = |B \cdot E| = |(B \cdot D)(A \cdot A) - (B \cdot A)(D \cdot A)|$$

In general the present invention as described thus far discloses a method for exchange of a cryptographic key K between the first cryptographic unit 12a and the second cryptographic unit 12b in which the mathematical functions evaluated by the key generator 52 of the first cryptographic unit 12a are totally different from the mathematical functions evaluated by the key generator 52 of the second cryptographic unit 12b. Moreover, for pedagogical reasons the preceding explanation of the vectorial key exchange method has arbitrarily chosen the first cryptographic unit 12a to generate the vectors A, B and C, and the second cryptographic unit 12b to generate the vectors D and E. However, as is readily apparent to those skilled in the art, the second cryptographic unit 12b could alternatively be used to produce the vectors A, B and C, and the first cryptographic unit 12a be used to produce the vectors D and E.

Vectorial key exchange can be generalized from three dimensional space into n-dimensional space. Let $R_n$ be an n-dimensional Euclidian space with a set of n standard unit vectors $e_i$'s:

$e_1 = (1, 0, 0, \ldots, 0)$
$e_2 = (0, 1, 0, \ldots, 0)$
$\ldots$
$e_1 = (0, 0, 0, \ldots, 1)$ A hyperplane $\Pi$ in the n-dimensional Euclidian space $R^n$ is a subspace in $R^n$ consisting of all possible linear combinations of the standard unit vectors $e_1, e_2, \ldots, e_n$, $$\sum_{i=1}^{n-1} l_i e_i.$$

Establishing a key using the n-dimensional standard unit vectors $e_1, e_2, \ldots, e_n$ requires first selecting and sharing between the key generator 52 of the first cryptographic unit 12a and the key generator 52 of the second cryptographic unit 12b a set of n–2 insecure, or public, n-element vectors "$p^i$" belonging to the space $R^n$.

$p^1 = (p_1^1, p_2^1, \ldots, p_n^1)$
$p^2 = (p_1^2, p_2^2, \ldots, p_n^2)$
.
.
.
$p^{n-2} = (p_1^{n-2}, p_2^{n-2}, \ldots, p_n^{n-2})$ In this n-dimensional vectorial key exchange protocol the public vectors $p^i$ are equivalent to the vector A in the two protocols for key exchange described above. The public vectors $p^i$ preferably lack any elements, $p_j^i$, that equal zero (0). Moreover, as described in greater detail below, n-dimensional vectorial key exchange requires evaluating a determinant. Because evaluation of this determinant constitutes evaluating an n-dimensional vector cross-product, no public vector $p^i$ may be parallel to a different public vector $p^j$.

Having established the set containing n–2 insecure vectors $p^i$, the quantity source 62 in the first cryptographic unit 12a and the quantity source 62 in the second cryptographic unit 12b then respectively choose additional secret n-element vectors "b" and "d" from the space $R^n$.

$b = (b_1, b_2, \ldots, b_n) \quad d = (d_1, d_2, \ldots, d_n)$

All of the elements of the vectors b and d, i.e. $b_j$, and $d_j$, preferably have a non-zero value. Moreover, for the reason stated above the vectors b and d must not be parallel to any of the public vectors $p^i$.

The quantity source 62 included in the first cryptographic unit 12a and in the second cryptographic unit 12b then respectively provide the vectors b and d to the key generator 52 of the first cryptographic unit 12a and to the key generator 52 of the second cryptographic unit 12b. The key generator 52 of the first cryptographic unit 12a and of the second cryptographic unit 12b then respectively establish determinants by combining as rows of the determinant the standard unit vectors e, either one or the other of the selected vectors b or d, and the n–2 public vectors $p^i$. The key generator 52 of the first cryptographic unit 12a and of the second cryptographic unit 12b then respectively determine conventional vectors $X_c$ and $X_E$ by evaluating such determinants as set forth below.

$$X_C = \det \begin{vmatrix} e_1 & e_2 & \ldots & e_n \\ b_1 & b_2 & \ldots & b_n \\ p_1^1 & p_2^1 & \ldots & p_n^2 \\ p_1^2 & p_2^2 & \ldots & p_n^2 \\ & & \ldots & \\ p_1^{n-2} & p_2^{n-2} & \ldots & p_n^{n-2} \end{vmatrix}$$

$$X_E = \det \begin{vmatrix} e_1 & e_2 & \ldots & e_n \\ d_1 & d_2 & \ldots & d_n \\ p_1^1 & p_2^1 & \ldots & p_n^2 \\ p_1^2 & p_2^2 & \ldots & p_n^2 \\ & & \ldots & \\ p_1^{n-2} & p_2^{n-2} & \ldots & p_n^{n-2} \end{vmatrix}$$

The key generator 52 of the first cryptographic unit 12a then transmits vector $X_c$ to the key generator 52 of the second cryptographic unit 12b, and the key generator 52 of the second cryptographic unit 12b transmits the vector $X_E$ to the key generator 52 of the first cryptographic unit 12a. Upon receiving the vector $X_E$, the key generator 52 of the first cryptographic unit 12a determines the cryptographic key K by evaluating an absolute value of the dot-product of the vector b with the vector $X_E$. Correspondingly, upon receiving the vector $X_c$, the key generator 52 of the second cryptographic unit 12b determines the cryptographic key K by evaluating absolute value of the dot-product of the vector d with the vector $X_c$.

$$K = |b \cdot X_E| \quad K = |d \cdot X_C|$$

For the reasons set forth above for the other vectorial key exchange protocols, the vector b must not be perpendicular to the vector $X_E$, and the vector d must not be perpendicular to the vector $X_c$. However, because n-dimensional vectorial key exchange may occupy a large number of spatial dimensions, seldom will one randomly chosen vector be parallel or perpendicular to another randomly chosen vector.

Similar to the first vectorial key exchange protocol described above, both the second and the n-dimensional vectorial key exchange protocols lack an inverse function for use in cryptanalysis to determine the cryptographic key K.

Complex Variable Key Exchange Protocol

Key exchange in accordance with the present invention is not limited to only vector algebra. For example key generators 52 in accordance with the present invention may employ other algebras, such as the algebra of complex numbers, in establishing a cryptographic key K. In using complex numbers to effect an exchange of the cryptographic key K, the quantity source 62 included in the first cryptographic unit 12a and in the second cryptographic unit 12b chooses a radius "r," also referred to as a modulus, and an angle "$\Theta$," also referred to as an argument, which specify a complex number expressed in form $z=r(\cos\Theta+i\sin\Theta)$. Accordingly, the quantity source 62 in the first cryptographic unit 12a chooses $Z_b=r_b(\cos\Theta_b+i\sin\Theta_b)$, while the quantity source 62 in the second cryptographic unit 12b chooses $Z_d=r_d(\cos\Theta_d+i\sin\Theta_d)$. The key generator 52 respectively of the first cryptographic unit 12a and of the second cryptographic unit 12b then use the quantities $Z_b$ and $Z_d$ in evaluating a mathematical function which raises a scalar constant "k" to a complex power thereby respectively determining complex number quantities C and E.

$$C = g^{z_b} \quad E = g^{z_d}$$

The scalar constant g is preferably a number "e" that is used as a base for natural logarithms.

The key generator 52 of the first cryptographic unit 12a then transmits the quantity C to the key generator 52 of the second cryptographic unit 12b while retaining the quantity $Z_b$. Correspondingly, the key generator 52 of the first cryptographic unit 12a transmits the quantity E to the key generator 52 of the first cryptographic unit 12a while retaining the quantity $Z_d$. Upon receiving the complex quantity E, the key generator 52 of the first cryptographic unit 12a thereupon determines the cryptographic key K by evaluating a function which raises the complex number quantity E to the power $Z_b$. Correspondingly, the key generator 52 of the second cryptographic unit 12b determines the cryptographic key K by evaluating a function which raises the complex number quantity C to the power $Z_d$.

$$K = (g^{z_e})^{z_b} \quad K = (g^{z_c})^{z_d}.$$

Because the complex number quantities $Z_b$ and $Z_d$ expressed in the modulus and argument form set forth above are periodic in the argument $\Theta$ having a period $2\pi$, the eavesdropper 82 knowing the quantities C and E is unable to compute the value either of the argument $\Theta_b$ or of the argument $\Theta_d$. Consequently, the eavesdropper 82 lacks an inverse function to employ in cryptanalysis to determine the cryptographic key K.

The preceding complex number protocol for key exchange requires evaluating mathematical functions which are computationally more intractable than the mathematical functions used in vectorial key exchange. However, the complex number key exchange protocol avoids any need to share the quantity A or the n−2 public vectors $p^i$ between the key generator 52 of the first cryptographic unit 12a and the second cryptographic unit 12b.

Convolution Key Exchange Protocol

A discrete convolution of two n-dimensional vectors $$f = (f_0, f_1, f_2, \ldots, f_{n-1}) \quad g = (g_0, g_1, g_2, \ldots, g_{n-1}),$$

denoted by f*g, produces an n-dimensional vector which is defined as follows.

$(f_0 g_0 + f_1 g_{n-1} + f_2 g_{n-2} + \ldots + f_{n-1} g_1,$ $f_0 g_1 + f_2 g_0 + f_3 g_{n-1} + \ldots + f_{n-1} g_2,$ $f*g = f_0 g_{n-1} + f_1 g_{n-2} + f_2 g_{n-3} + \ldots + f_{n-0})$ The first difference, $\Delta$, of a vector is defined as $$\Delta f = (f_0 - f_1, f_1 - f_2, \ldots, f_{n-1} - f_0).$$

A mathematical theorem establishes that $$\Delta(f*g) = f*\Delta g = \Delta f*g.$$

Using a protocol that is somewhat intermediate between vectorial key exchange and complex variable key exchange, discrete convolution can also be used to effect a key exchange. In using convolution to effect a exchange of a cryptographic key K, the quantity source 62 included in the first cryptographic unit 12a or the second cryptographic unit 12b chooses two vectors "A" and "B", while the quantity source 62 in the second cryptographic unit 12b or first cryptographic unit 12a chooses a third vector "D." The key generator 52 respectively of the first cryptographic unit 12a and of the second cryptographic unit 12b then use the quantities A and B or D in evaluating different functions. The key generator 52 associated with the quantity source 62 that has chosen the pair of vectors A and B computes the first difference of the discrete convolution of those two vectors. Alternatively, the key generator 52 associated with the quantity source 62 that has chosen the single vector D computes the first difference of that vector. Thus, the two key generator 52 respectively compute $$C = \Delta(A * B) \text{ and } E = \Delta(D).$$

The cryptographic units 12a and 12b then exchange the computed vectors C and E, after which the key generator 52 of the first cryptographic unit 12a and of the second cryptographic unit 12b then respectively use the quantities A and B and E=$\Delta$(D) or D and C=$\Delta$(A*B) to compute the cryptographic key K. The key generator 52 having the quantities A and B and E=$\Delta$(C) evaluates the discrete convolution A*B*E, while the key generator 52 having the quantities D and C=$\Delta$(A*B) evaluates the discrete convolution C*D.

$$K = A * B * E = A * B * \Delta(D) \quad K = C * D = \Delta(A * B) * D$$

The exchanged quantities that are available to the eavesdropper 82 consist of only the first differences respectively of the discrete convolution of two vectors A*B, and of the vector D. However, the actual values of the convolution A*B and of the vector D are required to compute the cryptographic key K. Because an inverse function $\Delta^{-1}$ which permits computing a vector from its first differences does not exist, the eavesdropper 82 lacks an inverse function to employ in cryptanalysis for determining the cryptographic key K.

Multi-Unit Vectorial Key Exchange Protocol

Using vectorial key exchange, a protocol exists for exchanging a key among an unlimited number of individuals. In such a multi-unit vectorial key exchange, one cryptographic unit 12 broadcasts, or all participating cryptographic units 12 agree upon, a shared public vector "$\alpha$," or upon n−2 public vectors $p^i$ of the n-dimensional vectorial key exchange protocol. Each of the cryptographic units 12 participating in the key exchange then computes the vector cross-product of their respective secret vector with the shared public vector α. While retaining the secret vector, each cryptographic unit 12 then transmits the result of the vector cross-product to all the other cryptographic units 12 participating in the key exchange, and receives from all the other cryptographic units 12 their respective vector cross-products. After a cryptographic unit 12 receives the vector cross-products from all other cryptographic units 12 participating in the key exchange, the cryptographic unit 12 computes a cumulative vector cross-product of all the vector quantities received from the other cryptographic units 12. The cryptographic unit 12 then determines the cryptographic key K by computing the absolute value of the vector dot-product of the retained secret vector with the result computed for the cumulative vector cross-product. In this way all of the cryptographic units 12 establish a shared cryptographic key K.

An example of multi-unit vectorial key exchange among four cryptographic units 12a, 12b, 12c and 12d (cryptographic units 12c and 12d not being illustrated in any of the FIGS.) is presented below. In the following example, all of the cryptographic units 12a, 12b, 12c and 12d communicate with each other over a common insecure communication channel 38 to which the eavesdropper 82 is presumed to listen.

In the following example, one of the cryptographic units, for example 12a, initiates the key exchange by selecting two non-parallel vectors "α" and "A." The key generator 52 of the cryptographic unit 12a then uses the vector cross-product function and the vectors α and A to compute a third vector "W."

$$W = A \times \alpha$$

After the key generator 52 computes the vector W, the first cryptographic unit 12a then retains the vectors α, A and W within the key generator 52 while broadcasting the vector α and the vector W from the output port 72 to the three other cryptographic units 12b, 12c and 12d participating in the multi-unit key exchange.

Upon receiving the vectors α and W, the second cryptographic unit 12b chooses a vector "B" and computes the vector cross-product "X" of the vectors B and α.

$$X = B \times \alpha$$

After the key generator 52 computes the vector X, it then retains the vectors α, W and X while broadcasting the vector X to the three other cryptographic units 12a, 12c and 12d.

Analogously, upon receiving the vectors α and W, the third cryptographic unit 12c chooses a vector "C" and computes the vector cross-product "Y" of the vectors C and α.

$$Y = C \times \alpha$$

After the key generator 52 computes the vector Y, it then retains the vectors α, C and Y while broadcasting the vector Y to the three other cryptographic units 12a, 12b and 12d.

Similarly, upon receiving the vectors α and W, the fourth cryptographic unit 12d chooses a vector "D" and computes the vector cross-product "Z" of the vectors D and α.

$$Z = D \times \alpha$$

After the key generator 52 computes the vector Z, it then retains the vectors α, D and Z while broadcasting the vector Z to the three other cryptographic units 12a, 12b and 12c.

At the conclusion of the four broadcasts, the key generators 52 of the four cryptographic units 12a–12d respectively have available to them the information tabulated below.

|  | Crypto. Unit 12a | Crypto. Unit 12b | Crypto. Unit 12c | Crypto Unit 12d |
|---|---|---|---|---|
| Secret Vectors | A | B | C | D |
| Received Vectors |  | α | α | α |
|  |  | W = (A × α) | W = (A × α) | W = (A × α) |
|  | X = (B × α) |  | X = (B × α) | X = (B × α) |
|  | Y = (C × α) | Y = (C × α) |  | Y = (C × α) |
|  | Z = (D × α) | Z = D × α) | Z = (D × α) |  |
| Transmitted Vectors | α |  |  |  |
|  | W = (A × α) | X = (B × α) | Y = (C × α) | Z = (D × α) |

Using the secret vector A and both the transmitted and received vectors in the following equation, the first cryptographic unit 12a computes a cryptographic key $K_a$.

$$K_a = |\alpha \cdot [A \times [\{A \times [Y \times Z]\} \times Y] \times Z] *$$
$$\{\alpha \cdot W \times X\} * \{\alpha \cdot X \times Y\} * \{\alpha \cdot X \times Z\}|$$

$$K_a = |\alpha \cdot [A \times [\{A \times [(C \times \alpha) \times (D \times \alpha)]\} \times (C \times \alpha)] \times (D \times \alpha)] *$$
$$\{\alpha \cdot (A \times \alpha) \times (B \times \alpha)\} * \{\alpha \cdot (B \times \alpha) \times (C \times \alpha)\} *$$
$$\{\alpha \cdot (B \times \alpha) \times (D \times \alpha)\}|$$

Analogously, using the secret vector D and both the transmitted and received vectors in the following equation, the second cryptographic unit 12b computes a cryptographic key $K_b$.

$$K_b = |\alpha \cdot [B \times [\{B \times [Y \times Z]\} \times Y] \times Z] *$$
$$\{\alpha \cdot X \times W\} * \{\alpha \cdot W \times Y\} * \{\alpha \cdot W \times Z\}|$$

$$K_b = |\alpha \cdot [B \times [\{B \times [(C \times \alpha) \times (D \times \alpha)]\} \times (C \times \alpha)] \times (D \times \alpha)] *$$
$$\{\alpha \cdot (B \times \alpha) \times (A \times \alpha)\} *$$
$$\{\alpha \cdot (A \times \alpha) \times (C \times \alpha)\} * \{\alpha \cdot (A \times \alpha) \times (D \times \alpha)\}|$$

Similarly, using the secret and both the transmitted and received vectors in the following equation, the third cryptographic unit 12c computes a cryptographic key $K_c$.

$$K_c = |\alpha \cdot [C \times [\{C \times [W \times X]\} \times W] \times X] *$$
$$\{\alpha \cdot Z \times W\} * \{\alpha \cdot Z \times Y\} * \{\alpha \cdot Z \times X\}|$$

$$K_c = |\alpha \cdot [C \times [\{C \times [(A \times \alpha) \times (B \times \alpha)]\} \times (A \times \alpha)] \times (B \times \alpha)] *$$
$$\{\alpha \cdot (D \times \alpha) \times (A \times \alpha)\} *$$
$$\{\alpha \cdot (D \times \alpha) \times (C \times \alpha)\} * \{\alpha \cdot (D \times \alpha) \times (B \times \alpha)\}|$$

Finally, using the secret and both the transmitted and received vectors in the following equation, the fourth cryptographic unit 12d computes a cryptographic key Ka.

$$K_d = |\alpha \cdot [D \times [\{D \times [X \times Y]\} \times X] \times Y] *$$
$$\{\alpha \cdot Z \times W\} * \{\alpha \cdot W \times X\} * \{\alpha \cdot W \times Y\}|$$

$$K_d = |\alpha \cdot [D \times [\{D \times [(B \times \alpha) \times (C \times \alpha)]\} \times (B \times \alpha)] \times (C \times \alpha)] *$$
$$\{\alpha \cdot (D \times \alpha) \times (A \times \alpha)\} *$$

-continued $$\{\alpha \cdot (A \times \alpha) \times (B \times \alpha)\} * \{\alpha \cdot (A \times \alpha) \times (C \times \alpha)\}|$$

A vector algebraic analysis of the preceding equations establishes that $$K_a = K_b = K_c = K_d = K.$$

Accordingly, all four cryptographic units 12a–12d now share the same cryptographic key K.

Use of Modulus Function In Key Exchange

Using vectors having components that are positive integers, and that have a large number of digits for all vector components enhances the security of key exchange in accordance with the present invention. Using such vectors in performing key exchange combined with application a modulus function by the key generator 52 to the cryptographic key K produces a modulus cryptographic key $K_m$. The key generator 52 supplies the cryptographic key $K_m$ to the cryptographic device 14 for use in encrypting the plaintext message P and in decrypting the cyphertext message M. Use of the modulus cryptographic key $K_m$ blocks avenues of cryptanalysis that might otherwise be exploited by the eavesdropper 82 if the cryptographic key K were used directly.

Thus for the vectorial key exchange protocols described above, applying a modulus function to the cryptographic key K provides in the following modulus cryptographic key $K_m$ for use by the cryptographic device 14 in encrypting the plaintext message P and decrypting the cyphertext message M.

$$K_m = |D \cdot C| \text{MOD}(n)$$

$$K_m = |B \cdot E| \text{MOD}(n)$$

Similarly, the following two modulus functions are used to establish a modulus cryptographic key $K_m$ instead of the second set of vector functions described above.

$$K_m = |C \cdot (A \times D)| \text{MOD}(n)$$

$$K_m = |B \cdot E| \text{MOD}(n)$$

For the key exchange protocol that uses convolution, application of a modulus function results in the following functions being used to establish a modular cryptographic key $K_m$.

$$K_m = |A*B*A\Delta(C)| \text{MOD}(n)$$

$$K_m = |\Delta(A*B)*C| \text{MOD}(n)$$

The modulus "n" may, in principle, be chosen arbitrarily. However, at present integer keys exceeding $2^{32}-1$ appear sufficiently large to resist cryptanalysis. Accordingly, each of the vector components must be no shorter than 3 bytes, 24 bits, and preferably utilizes close to 32 bits. However, key exchange which is even more resistant to cryptanalysis is easily implemented with the present invention. For example, if $10^{27}$ possible keys were desired, it is sufficient to use three component vectors for key exchange, each component of which contains 9 decimal digits together with a correspondingly large modulus "n."

Although the present invention has been described in terms of the presently preferred embodiment, it is to be understood that such disclosure is purely illustrative and is not to be interpreted as limiting. Thus, for example, the cryptographic device 14 included in each of the cryptographic units 12a and 12b may employ any symmetric cyptrographic method including any such method disclosed in Schneier. Similarly, individual portions of the cryptographic units 12, or even the entire cryptographic units 12, may be implemented either by a computer program executed by a general purpose microprocessor, by a computer program executed by a special purpose microprocessor such as a digital signal processor, by special purpose dedicated hardware such as either a field programmable gate array ("FPGA") or an application specific integrated circuit ("ASIC"), or by any combination thereof. For each of the technologies identified above, the invention disclosed herein may be easily implemented by anyone skilled in a particular technology chosen to implement the invention, e.g. computer programming and/or hardware design including, FPGA programming and ASIC design. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. In a protocol for cryptographic communication via a communication channel "I" in which a transmitting cryptographic unit "T" broadcasts onto the communication channel I an encrypted cyphertext message "M" obtained by supplying both a plaintext message "P" and a cryptographic key "K" to a first cryptographic device, and in which a receiving cryptographic unit "R" receives the broadcast cyphertext message M and by supplying the cyphertext message M together with the key K to a second cryptographic device decrypts the plaintext message P therefrom, a method by which the units T and R mutually establish a cryptographic key K by first exchanging messages before the unit T broadcasts the cyphertext message M comprising the steps of:

a. at a first of the units T or R:
  i. selecting a first quantity "A" and a second quantity "B;"
  ii. using a first mathematical function "$\Phi_1$" and the quantities A and B, computing a third quantity "C"= $\Phi_1(A, B)$, the quantities A and B and the function $\Phi_1$ being such that knowing one or the other of the selected quantities A or B, the computed quantity C, and the function $\Phi_1$, there does not exist an inverse function $\Phi_1$ that may be used for directly computing the unknown quantity A or B;
  iii. transmitting the selected quantity A together with the quantity C from the first unit T or R to a second unit R or T; and
  iv. retaining at the first unit T or R the selected quantity B;

b. at the second unit R or T:
  i. receiving the quantities A and C transmitted by the first unit T or R;
  ii. selecting a fourth quantity "D;"
  iii. using a second mathematical function "$\Phi_2$" and the received quantity A together with the selected quantity D, computing a fifth quantity "E"=$\Phi_2(A, D)$, the quantities A and D and the function $\Phi_2$ being such that knowing one or the other of the selected quantities A or D, the computed quantity E, and the function $\Phi_2$, there does not exist an inverse function $\Phi_2$ that may be used for directly computing the unknown quantity A or D;

iv. transmitting the computed quantity E from the second unit R or T to the first unit T or R;

v. retaining at the second unit R or T the selected quantity D; and vi. using a third mathematical function "$\Psi_2$" and the retained quantity D together with the received quantity C, computing the key K=$\Psi_2$(D, C)=$\Psi_2$(D, $\Phi_1$\{A, B\}); and c. at the first unit T or R:

i. receiving the quantity E transmitted by the unit R or T; and ii. using a fourth mathematical function "$\Psi_1$" and the retained quantity B together with the received quantity E, computing the key K=$\Psi_1$(B, E)=$\Psi_1$(B, $\Phi_2$\{A, D\})=$\Psi_2$(D, $\Phi_1$\{A, B\}).

2. The method by which the units T and R mutually establish the cryptographic key K of claim 1 wherein the function $\Phi_1$ is identical to function $\Phi_2$, and wherein the function $\Psi_1$ is identical to the function $\Psi_2$.

3. The method by which the units T and R mutually establish the cryptographic key K of claim 2 wherein the quantities A, B and C are respectively selected by a random number generator.

4. The method by which the units T and R mutually establish the cryptographic key K of claim 2 wherein the first unit T or R transmits the selected quantity A together with the quantity C to the second unit R or T via the communication channel I, and the second unit R or T transmits the quantity E from the second unit R or T back to the first unit T or R via the communication channel I.

5. The method by which the units T and R mutually establish the cryptographic key K of claim 2 wherein:

a. the selected quantities A, B and D are vectors;

b. the vectors A and B are not parallel;

c. the vectors A and D are not parallel;

d. the vector D is not coplanar with the vectors A and B;

e. the function $\Phi_1$ is a vector cross-product whereby the computed quantities C and E are vectors C and E; and f. the function $\Psi_1$ is an absolute value of a vector dot-product.

6. The method by which the units T and R mutually establish the cryptographic key K of claim 5 further comprising a step, performed by each of the units T and R, of applying a modulus function while establishing the cryptographic key K thereby establishing a modulus key $K_m$.

7. A cryptographic system adapted for cryptographic communication comprising:

a. a communication channel "I" adapted for transmission of an encrypted cyphertext message "M;"

b. a pair of transceivers that are coupled to said communication channel I, and that are adapted for communicating the cyphertext message M from one transceiver to another transceiver via said communication channel I; and c. a pair of cryptographic units, each cryptographic unit including:

i. a quantity source for selecting one or more quantities to be used in establishing a cryptographic key "K" prior to communicating the cyphertext message M, and for transmitting such selected quantities from a quantity output port of the quantity source;

ii. a key generator having a quantity input port for accepting one or more quantities selected by the quantity source, the key generator employing such quantities in establishing the key K which the key generator transmits from a key output port; and iii. a cryptographic device having:

(1) a key input port for receiving the key K from the key generator;

(2) a plaintext port adapted either for accepting a plaintext message "P" for encryption into the cyphertext message M and transmission from the cryptographic device, or for delivering a plaintext message P obtained by decryption of the cyphertext message M received by the cryptographic device; and (3) a cyphertext port adapted either for transmitting the cyphertext message M to one of said transceivers, or for receiving the cyphertext message M from such transceiver, the key generators of said cryptographic units collaboratively establishing the key K by:

a. the key generator of a first of the cryptographic units:

i. using a first mathematical function "$\Phi_1$" together with a first quantity "A" and a second quantity "B," that are selected by the quantity source of the first cryptographic unit, to compute a third quantity "C"=$\Phi_1$(A, B), the quantities A and B and the function $\Phi_1$ being such that knowing one or the other of the selected quantities A or B, the quantity C, and the function $\Phi_1$, there does not exist an inverse function $\Phi_1$ that may be used for directly computing the unknown quantity A or B;

ii. transmitting the selected quantity A together with the quantity C from the key generator of said first cryptographic unit to the key generator of a second cryptographic unit; and iii. retaining at the first cryptographic unit the quantity B;

b. the key generator of said second cryptographic unit:

i. using a second mathematical function "$\Phi_2$" together with the selected quantity A received from the first cryptographic unit and a fourth quantity "D," that is selected by the quantity source of said second cryptographic unit, to compute a fifth quantity "E"=$\Phi_2$(A, D), the quantities A and D and the function $\Phi_2$ being such that knowing one or the other of the selected quantities A or D, the computed quantity E, and the function $\Phi_2$, there does not exist an inverse function $\Phi_2$ that may be used for directly computing the unknown quantity A or D;

ii. transmitting the computed quantity E from the key generator of said second cryptographic unit to the key generator of said first cryptographic unit;

iii. retaining at the second cryptographic unit the selected quantity D; and iv. using a third mathematical function "$\Psi_2$" and the retained quantity D together with the received quantity C to compute the key K=$\Psi_2$(D, C)=$\Psi_2$(D, $\Phi_1$\{A, B\}); and c. the key generator of said first cryptographic unit:

i. using a fourth mathematical function "$\Psi_1$" and the retained quantity B together with the received quantity E to compute the key K=$\Psi_1$(B, E)=$\Psi_1$(B, $\Phi_2$\{A, D\})=$\Psi_2$(D, $\Phi_1$\{A, B\}).

8. The cryptographic system of claim 7 wherein the function $\Phi_1$ is identical to function $\Phi_2$, and wherein the function $\Psi_1$ is identical to the function $\Psi_2$.

9. The cryptographic system of claim 8 wherein the selected quantities A, B and D are respectively selected by a random number generator.

10. The cryptographic system of claim 8 wherein the first cryptographic unit transmits the selected quantity A together with the quantity C to the second cryptographic unit via the communication channel I, and the second cryptographic unit transmits the quantity E from the second cryptographic unit back to the first cryptographic unit via the communication channel I.

11. The cryptographic system of claim 8 wherein:
   a. the selected quantities A, B and D are vectors;
   b. the vectors A and B are not parallel;
   c. the vectors A and D are not parallel;
   d. the vector D is not coplanar with the vectors A and B;
   e. the function $\Phi_1$ is a vector cross-product whereby the computed quantities C and E are vectors C and E; and
   f. the function $\Psi_1$ is an absolute value of a vector dot-product.

12. The cryptographic system of claim 11 wherein the key generators of both cryptographic units respectively apply a modulus function while establishing the cryptographic key K thereby establishing a modulus key $K_m$.

13. A cryptographic unit adapted for inclusion into a cryptographic system that performs cryptographic communication, the cryptographic system including:
   a. a communication channel "I" adapted for transmission of an encrypted cyphertext message "M;" and
   b. a pair of transceivers that are coupled to said communication channel I, and that are adapted for communicating the cyphertext message M from one transceiver to another transceiver via said communication channel I, said cryptographic unit comprising:
   a. a quantity source for selecting one or more quantities to be used in establishing a cryptographic key "K" prior to communicating the cyphertext message M, and for transmitting such selected quantities from a quantity output port of the quantity source;
   b. a key generator having a quantity input port for accepting one or more quantities selected by the quantity source, the key generator employing such quantities in establishing the key K which the key generator transmits from a key output port; and
   c. a cryptographic device having:
      i. a key input port for receiving the key K from the key generator;
      ii. a plaintext port adapted either for accepting a plaintext message "P" for encryption into the cyphertext message M and transmission from the cryptographic device, or for delivering a plaintext message P obtained by decryption of the cyphertext message M received by the cryptographic device; and
      iii. a cyphertext port adapted either for transmitting the cyphertext message M to one of the transceivers, or for receiving the cyphertext message M from such transceiver, the key generator of said cryptographic unit being adapted for establishing the key K collaboratively by communicating with a second cryptographic unit included in the cryptographic system by:
   a. using a first mathematical function "$\Phi_1$" together with a first quantity "A" and a second quantity "B," that are selected by the quantity source of said cryptographic unit, in computing a third quantity "C"=$\Phi_1$(A, B), the quantities A and B and the function $\Phi_1$ being such that knowing one or the other of the selected quantities A or B, the quantity C, and the function $\Phi_1$, there does not exist an inverse function $\Phi_1$ that may be used for directly computing the unknown quantity A or B;
   b. transmitting the quantity A together with the quantity C from the key generator of said cryptographic unit to the second cryptographic unit; and
   c. retaining at the first cryptographic unit the quantity B;
   d. receiving from the second cryptographic unit a fourth quantity "E" that has been obtained by computationally evaluating a second mathematical function "$\Phi_2$," the function $\Phi_2$ being such that knowing the quantity E, the function $\Phi_2$, and all but one of the variables used in evaluating the function $\Phi_2$, there does not exist an inverse function $\Phi_2$ that may be used for directly computing the unknown variable; and
   e. using a third mathematical function "$\Psi_1$" and the retained quantity B together with the received quantity E to compute the key K=$\Psi_1$(B, E).

14. The cryptographic unit of claim 13 wherein the function $\Phi_1$ is identical to function $\Phi_2$.

15. The cryptographic unit of claim 13 wherein the quantities A and B are respectively selected by a random number generator.

16. The cryptographic unit of claim 13 wherein said cryptographic unit transmits the quantity A together with the quantity C to the second cryptographic unit via the communication channel I, and receives the quantity E from the second cryptographic unit via the communication channel I.

17. The cryptographic unit of claim 13 wherein:
   a. the quantities A and B and the received quantity E are vectors;
   b. the vectors A and B are not parallel;
   c. the vector E is not perpendicular to the vector B;
   d. the function $\Phi_1$ is a vector cross-product whereby the quantity C is a vector C; and
   e. the function $\Psi_1$ is an absolute value of a vector dot-product.

18. The cryptographic unit of claim 17 wherein, while establishing the cryptographic key K, the key generator of said cryptographic unit applies a modulus function thereby establishing a modulus key $K_m$.

19. The cryptographic unit of claim 13 further comprising the transceiver to which the cyphertext port of said cryptographic unit transmits the cyphertext message M, or from which the cyphertext port of said cryptographic unit receives the cyphertext message M.

20. A cryptographic unit adapted for inclusion into a cryptographic system that performs cryptographic communication, the cryptographic system including:
   a. a communication channel "I" adapted for transmission of an encrypted cyphertext message "M;" and
   b. a pair of transceivers that are coupled to the communication channel I, and that are adapted for communicating the cyphertext message M from one transceiver to another transceiver via the communication channel I, said cryptographic unit comprising:
   a. a quantity source for selecting one or more quantities to be used in establishing a cryptographic key "K" prior to communicating the cyphertext message M, and for transmitting such selected quantities from a quantity output port of the quantity source;
   b. a key generator having a quantity input port for accepting one or more quantities selected by the quantity source, the key generator employing such quantities in establishing the key K which the key generator transmits from a key output port; and
   c. a cryptographic device having:
      i. a key input port for receiving the key K from the key generator;

ii. a plaintext port adapted either for accepting a plaintext message "P" for encryption into the cyphertext message M and transmission from the cryptographic device, or for delivering a plaintext message P obtained by decryption of the cyphertext message M received by the cryptographic device; and iii. a cyphertext port adapted either for transmitting the cyphertext message M to one of the transceivers, or for receiving the cyphertext message M from such transceiver, the key generator of said cryptographic unit being adapted for establishing the key K collaboratively by communicating with a second cryptographic unit included in the cryptographic system by:

a. receiving from the second cryptographic unit a first quantity "C" that has been obtained by computationally evaluating a first mathematical function "$\Phi_1$," the function $\Phi_1$ being such that knowing the quantity C, the function $\Phi_1$, and all but one of the variables used in evaluating the function $\Phi_1$, there does not exist an inverse function $\Phi_1$ that may be used for directly computing the unknown variable; and b. using a second mathematical function "$\Psi_2$" together with the quantity C, that said key generator receives from the second cryptographic unit, and a second quantity "D," that is selected by the quantity source included in the second cryptographic unit, the key generator computes the key $K=\Psi_2(D, C)$.

21. The cryptographic unit of claim 20 wherein the key generator of said cryptographic unit, in collaboratively establishing the key K by communicating with the second cryptographic unit included in the cryptographic system, also:

c. uses a third mathematical function "$\Phi_2$" together with a quantity A, also received from the second cryptographic unit, and with the second quantity D to compute a fifth quantity "$E$"$=\Phi_2(A, D)$, the quantities A and D and the function $\Phi_2$ being such that knowing one or the other of the quantities A or D, the computed quantity E, and the function $\Phi_2$, there does not exist an inverse function $\Phi_1$ that may be used for directly computing the unknown quantity A or D; and d. transmits the computed quantity E from the key generator of said first cryptographic unit to the second cryptographic unit.

22. The cryptographic unit of claim 21 wherein the function $\Phi_1$ is identical to function $\Phi_2$.

23. The cryptographic unit of claim 20 wherein the quantity D is selected by a random number generator.

24. The cryptographic unit of claim 20 wherein said cryptographic unit receives the quantity C via the communication channel I.

25. The cryptographic unit of claim 20 wherein:

a. the quantities C and D are vectors;

b. the vector D is not perpendicular to the vector C; and c. the function $\Psi_2$ is an absolute value of a vector dot-product.

26. The cryptographic unit of claim 25 wherein, while establishing the cryptographic key K, the key generator of said cryptographic unit applies a modulus function thereby establishing a modulus key $K_m$.

27. The cryptographic unit of claim 20 further comprising the transceiver to which the cyphertext port of said cryptographic unit transmits the cyphertext message M, or from which the cyphertext port of said cryptographic unit receives the cyphertext message M.

28. A key generator adapted for inclusion into a cryptographic unit that is adapted for inclusion into a cryptographic system that performs cryptographic communication, the cryptographic system including:

a. a communication channel "I" adapted for transmission of an encrypted cyphertext message "M;" and b. a pair of transceivers that are coupled to the communication channel I, and that are adapted for communicating the cyphertext message M from one transceiver to another transceiver via the communication channel I, and c. a pair of cryptographic units, each cryptographic unit including a cryptographic device having:

i. a key input port for receiving a cryptographic key "K" prior to communicating the cyphertext message M;

ii. a plaintext port adapted either for accepting a plaintext message "P" for encryption into the cyphertext message M and transmission from the cryptographic device, or for delivering a plaintext message P obtained by decryption of the cyphertext message M received by the cryptographic device; and iii. a cyphertext port adapted either for transmitting the cyphertext message M to one of the transceivers, or for receiving the cyphertext message M from such transceiver, the key generator adapted for inclusion into at least one of the cryptographic units comprising:

a. a quantity input port for accepting one or more quantities to be used by the key generator in establishing the key K;

b. a key output port from which the key generator transmits the key K to the key input port of the cryptographic device included in the cryptographic unit that includes the key generator;

the key generator of the cryptographic unit being adapted for establishing the key K collaboratively by communicating with a second cryptographic unit included in the cryptographic system by:

a. receiving from the second cryptographic unit a first quantity "C" that has been obtained by computationally evaluating a first mathematical function "$\Phi_1$," the function $\Phi_1$ being such that knowing the quantity C, the function $\Phi_1$, and all but one of the variables used in evaluating the function $\Phi_1$, there does not exist an inverse function $\Phi_1$ that may be used for directly computing the unknown variable; and b. using a second mathematical function "$\Psi_2$" together with the quantity C, that the key generator receives from the second cryptographic unit, and a second quantity "D," that is supplied to the quantity input port of the key generator, the key generator computes the key $K=\Psi_2(D, C)$.

29. The cryptographic unit of claim 28 wherein the key generator of said cryptographic unit, in collaboratively establishing the key K by communicating with the second cryptographic unit included in the cryptographic system, also:

c. uses a third mathematical function "$\Phi_2$" together with a quantity A, also received from the second cryptographic unit, and with the second quantity D to compute a fifth quantity "$E$"$=\Phi_2(A, D)$, the quantities A and D and the function $\Phi_2$ being such that knowing one or the other of the quantities A or D, the computed quantity E, and the function $\Phi_2$, there does not exist an inverse function $\Phi_2$ that may be used for directly computing the unknown quantity A or D; and d. transmits the computed quantity E from the key generator of said first cryptographic unit to the second cryptographic unit.

30. The cryptographic unit of claim 29 wherein the function $\Phi_1$ is identical to function $\Phi_2$.

31. The key generator of claim 28 further comprising a quantity source for selecting one or more quantities to be used in establishing the key K, the key generator including a quantity output port for transmitting such selected quantities from the quantity source to the quantity input port of the key generator.

32. The key generator of claim 31 wherein the quantity D is selected by a random number generator.

33. The key generator of claim 28 wherein the cryptographic unit receives the quantity C via the communication channel I.

34. The key generator of claim 28 wherein:
 a. the quantities C and D are vectors;
 b. the vector D is not perpendicular to the vector C; and
 c. the function $\Psi_2$ is an absolute value of a vector dot-product.

35. The key generator of claim 34 wherein, while establishing the cryptographic key K, the key generator applies a modulus function thereby establishing a modulus key $K_m$.

36. In a protocol for cryptographic communication via a communication channel "I" in which a transmitting cryptographic unit "T" broadcasts onto the communication channel I an encrypted cyphertext message "M" obtained by supplying both a plaintext message "P" and a cryptographic key "K" to a first cryptographic device, and in which a receiving cryptographic unit "R" receives the broadcast cyphertext message M and by supplying the cyphertext message M together with the key K to a second cryptographic device decrypts the plaintext message P therefrom, a method by which the units T and R mutually establish a cryptographic key K by first exchanging messages before the unit T broadcasts the cyphertext message M comprising the steps of:
 a. at a first of the units T or R:
  i. selecting a first quantity "B;"
  ii. using a first mathematical function "$\Phi$" together with the selected quantity B, computing a second quantity "C"=$\Phi$(B), the function $\Phi$ being such that knowing the quantity C and the function $\Phi$, there does not exist an inverse function of function $\Phi$ that may be used for directly computing quantity B;
  iii. transmitting the quantity C from the first unit T or R to a second unit R or T; and
  iv. retaining at the first unit T or R the quantity B;
 b. at the second unit R or T:
  i. selecting a third quantity "D;"
  ii. using the first mathematical function $\Phi$ together with the selected quantity D, computing a fourth quantity "E"=$\Phi$(D), the function $\Phi$ being such that knowing the quantity E and the function $\Phi$, there does not exist an inverse function of function $\Phi$ that may be used for directly computing quantity D;
  iii. transmitting the computed quantity E from the second unit R or T to the first unit T or R;
  iv. retaining at the first unit R or T the quantity D;
  V. receiving the quantity C transmitted by the first unit T or R; and
  vi. using a second mathematical function "$\Psi$" together with the quantity D and the received quantity C, computing the key K=$\Psi$(D, C); and
 c. at the first unit T or R:
  i. receiving the quantity E transmitted by the unit R or T; and
  ii. using the second mathematical function $\Psi$ and the retained quantity B together with the received quantity E, computing the key K=$\Psi$(B, E)=$\Psi$(D, C).

37. The method by which the units T and R mutually establish the cryptographic key K of claim 36 wherein the selected quantities B and D are respectively selected by a random number generator.

38. The method by which the units T and R mutually establish the cryptographic key K of claim 36 wherein the first unit T or R transmits the quantity C via the communication channel I, and the second unit R or T transmits the quantity E from the second unit R or T back to the first unit T or R via the communication channel I.

39. The method by which the units T and R mutually establish the cryptographic key K of claim 36 wherein an inverse function $\Phi^{-1}$ of the function $\Phi$ has an unlimited number of periodic solutions.

40. The method by which the units T and R mutually establish the cryptographic key K of claim 36 wherein:
 a. the quantity B and the quantity D are respectively complex numbers of the form $z_b = r_b(\cos\Theta_b + i\sin\Theta_b)$ and $z_d = r_d(\cos\Theta_d + i\sin\Theta_d)$;
 b. the function $\Phi$ is an arbitrarily chosen scalar constant "g" raised to a complex number power respectively by the complex number quantities B or D whereby the computed quantities C and E are complex numbers, $$C = g^{z_b} \quad E = g^{z_d}; \text{ and}$$

c. the function $\Psi$ is either a modulus or an argument of the complex number C or E raised to a complex number power respectively by the complex number quantities B or D, $$K = (g^{z_d})^{z_b} \quad K = (g^{z_b})^{z_d}.$$

41. The method by which the units T and R mutually establish the cryptographic key K of claim 40 wherein the scalar constant is a number "e" that is used as a base for natural logarithms.

42. The method by which the units T and R mutually establish the cryptographic key K of claim 36 wherein:
 a. the quantity B and the quantity D are respectively n-dimensional vectors respectively B=$(b_1, b_2, \ldots, b_n)$ and D=$(d_1, d_2, \ldots, d_n)$;
 b. the function $\Phi$ evaluates a determinant to obtain conventional vectors $X_C$ and $X_E$, the determinants so evaluated respectively including:
  i. a row that contains a set of standard unit vectors $(e_1, e_2, \ldots, e_n)$;
  ii. a row that contains respectively either the n-dimensional vector B or the n-dimensional vector D depending upon whether the determinant is being evaluated to establish either the vector $X_C$ or the vector $X_E$; and
  iii. n−2 remaining rows of the determinant contain a set of (n−2) public vectors $$p^1 = (p_1^1, p_2^1, \ldots, p_n^1)$$
$$p^2 = (p_1^2, p_2^2, \ldots, p_n^2)$$
$$\vdots$$
$$p^{n-2} = (p_1^{n-2}, p_2^{n-2}, \ldots, p_n^{n-2}); \text{ and}$$

c. the function $\Psi$ is an absolute value of a vector dot-product respectively of the vector B with the vector $X_E$, $K=|(b_1, b_2, \ldots, b_n) \cdot X_E, |$, or of the vector D with the vector $X_C$, $K=|(d_1, d_2, \ldots, d_n) \cdot X_c|$.

43. In a protocol for cryptographic communication via a communication channel "I" in which a transmitting cryptographic unit "T" broadcasts onto the communication channel I an encrypted cyphertext message "M" obtained by supplying both a plaintext message "P" and a cryptographic key "K" to a first cryptographic device, and in which a receiving cryptographic unit "R" receives the broadcast cyphertext message M and by supplying the cyphertext message M together with the key K to a second cryptographic device decrypts the plaintext message P therefrom, a method by which the units T and R mutually establish a cryptographic key K by first exchanging messages before the unit T broadcasts the cyphertext message M comprising the steps of:

a. at a first of the units T or R:
   i. selecting a first quantity "A" and a second quantity "B;"
   ii. using a first mathematical function "$\Phi_1$" together with the selected quantities A and B, computing a second quantity "C"=$\Phi_1$(A, B), the function $\Phi$ being such that knowing the quantity C and the function $\Phi_1$, there does not exist an inverse function of $\Phi_1$ that may be used for directly computing the quantities A or B;
   iii. transmitting the quantity C from the first unit T or R to a second unit R or T; and
   iv. retaining at the first unit T or R the quantities A and B;

b. at the second unit R or T:
   i. selecting a third quantity "D;"
   ii. using a second mathematical function "$\Phi_2$" together with the selected quantity D, computing a fourth quantity "E"=$\Phi_2$(D), the function $\Phi_2$ being such that knowing the quantity E and the function $\Phi_2$, there does not exist an inverse function of $\Phi_2$ that may be used for directly computing quantity D;
   iii. transmitting the computed quantity E from the second unit R or T to the first unit T or R;
   iv. retaining at the first unit R or T the quantity D;
   v. receiving the quantity C transmitted by the first unit T or R; and
   vi. using a third mathematical function "$\Psi_2$" and the retained quantity D together with the received quantity C, computing the key K=$\Psi_2$(D, C)=$\Psi_2$(D, $\Phi_1$\{A, B\}); and c. at the first unit T or R:
   i. receiving the quantity E transmitted by the unit R or T; and
   ii. using a fourth mathematical function "$\Psi_1$" and the retained quantities A and B together with the received quantity E, computing the key K=$\Psi$(A, B, E)=$\Psi$(D, C).

44. The method by which the units T and R mutually establish the cryptographic key K of claim 43 wherein the selected quantities B and D are respectively selected by a random number generator.

45. The method by which the units T and R mutually establish the cryptographic key K of claim 43 wherein the first unit T or R transmits the quantity C via the communication channel I, and the second unit R or T transmits the quantity E from the second unit R or T back to the first unit T or R via the communication channel I.

46. The method by which the units T and R mutually establish the cryptographic key K of claim 43 wherein:
   a. the selected quantities A, B and D are vectors;
   b. the computed quantities C and E are vectors;
   c. the function $\Phi_1$ is a first difference "$\Delta$" of a convolution "*" of the vectors A and B;
   d. the function $\Phi_2$ is a first difference $\Delta$ of the vector D;
   e. the function $\Psi_2$ is a convolution * of the vector C with the vector D; and
   f. the function $\Psi_1$ is a convolution * of the vectors A and B convolved * with the vector E.

47. The method by which the units T and R mutually establish the key K of claim 46 further comprising a step, performed by each of the units T and R, of applying a modulus function while establishing the cryptographic key K thereby establishing a modulus key $K_m$.

* * * * *